United States Patent
Luckhardt et al.

(10) Patent No.: US 11,722,330 B2
(45) Date of Patent: Aug. 8, 2023

(54) METHOD FOR DATA COMMUNICATION WITH A DOMESTIC APPLIANCE BY A MOBILE COMPUTER DEVICE, MOBILE COMPUTER DEVICE AND DOMESTIC APPLIANCE

(71) Applicant: Electrolux Appliances Aktiebolag, Stockholm (SE)

(72) Inventors: Christoph Luckhardt, Rothenburg ob der Tauber (DE); Fabienne Reinhard-Herrscher, Rothenburg ob der Tauber (DE); Kersten Kaiser, Rothenburg ob der Tauber (DE); Christoph Walther, Rothenburg ob der Tauber (DE); Daniel Arler, Stockholm (SE); Sandro Comuzzi, Brussels (BE)

(73) Assignee: Electrolux Appliances Aktiebolag, Stockholm (SE)

(*) Notice: Subject to any disclaimer, the term of this patent is extended or adjusted under 35 U.S.C. 154(b) by 276 days.

(21) Appl. No.: 15/328,551

(22) PCT Filed: Aug. 27, 2015

(86) PCT No.: PCT/EP2015/069597
§ 371 (c)(1),
(2) Date: Jan. 24, 2017

(87) PCT Pub. No.: WO2016/034479
PCT Pub. Date: Mar. 10, 2016

(65) Prior Publication Data
US 2017/0211816 A1 Jul. 27, 2017

(30) Foreign Application Priority Data
Sep. 3, 2014 (EP) .................................. 14183303

(51) Int. Cl.
*H04L 12/28* (2006.01)
*H04L 12/64* (2006.01)
(Continued)

(52) U.S. Cl.
CPC .......... *H04L 12/2807* (2013.01); *F24C 7/085* (2013.01); *F24C 7/087* (2013.01);
(Continued)

(58) Field of Classification Search
CPC ............... H04L 12/2816; H04L 12/282; H04L 12/2834
(Continued)

(56) References Cited

U.S. PATENT DOCUMENTS 4,345,145 A 8/1982 Norwood
5,361,681 A 11/1994 Hedstrom et al.
(Continued)

FOREIGN PATENT DOCUMENTS

DE 4217749 12/1993
DE 10 2007 048834 A1 4/2008
(Continued)

OTHER PUBLICATIONS

International Search Report and Written Opinion from Corresponding Application No. PCT/EP2015/069597; dated Nov. 2, 2015.
(Continued)

*Primary Examiner* — Nasser M Goodarzi
*Assistant Examiner* — Jaycee Imperial
(74) *Attorney, Agent, or Firm* — Pearne & Gordon LLP

(57) ABSTRACT

A method for data communication with a domestic appliance by a mobile computer device. The domestic appliance and the mobile computer device are interconnected or interconnectable via a wireless data connection. The wireless data connection is adapted for transferring signals between the domestic appliance and the mobile computer device. Further, the present invention relates to application software for
(Continued)

the mobile computer device. Moreover, the present invention relates to a domestic appliance. Additionally, the present invention relates to a mobile computer device including a display or touch screen.

47 Claims, 7 Drawing Sheets

(51) Int. Cl.
*F24C 15/02* (2006.01)
*G08C 17/02* (2006.01)
*H04Q 9/00* (2006.01)
*H04L 65/612* (2022.01)
*H04L 65/75* (2022.01)
*H04N 23/63* (2023.01)
*F24C 7/08* (2006.01)
*H04W 76/10* (2018.01)
*G05B 19/042* (2006.01)
*H04N 7/18* (2006.01)
*G06F 16/903* (2019.01)
*H04W 84/12* (2009.01)
*H04W 52/02* (2009.01)
*G06F 16/24* (2019.01)

(52) U.S. Cl.
CPC .......... *F24C 15/023* (2013.01); *F24C 15/024* (2013.01); *G05B 19/042* (2013.01); *G08C 17/02* (2013.01); *H04L 12/282* (2013.01); *H04L 12/2803* (2013.01); *H04L 12/2816* (2013.01); *H04L 12/2834* (2013.01); *H04L 12/6418* (2013.01); *H04L 65/612* (2022.05); *H04L 65/762* (2022.05); *H04N 7/183* (2013.01); *H04N 23/63* (2023.01); *H04Q 9/00* (2013.01); *H04W 76/10* (2018.02); *G05B 2219/2613* (2013.01); *G05B 2219/2628* (2013.01); *G05B 2219/2643* (2013.01); *G06F 16/24* (2019.01); *G06F 16/90335* (2019.01); *G08C 2201/93* (2013.01); *H04L 2012/285* (2013.01); *H04L 2012/2841* (2013.01); *H04M 2250/22* (2013.01); *H04Q 2209/40* (2013.01); *H04Q 2209/43* (2013.01); *H04Q 2209/80* (2013.01); *H04Q 2209/84* (2013.01); *H04W 52/0235* (2013.01); *H04W 84/12* (2013.01); *Y02D 30/70* (2020.08)

(58) Field of Classification Search
USPC ........................................................ 348/89
See application file for complete search history.

(56) References Cited

U.S. PATENT DOCUMENTS

| 5,870,680 | A  | * | 2/1999  | Guerlin   | G06F 1/3215    |
|           |    |   |         |           | 455/557        |
| 2003/0053537 | A1 | * | 3/2003  | Kim       | H03M 7/30     |
|           |    |   |         |           | 375/240.01    |
| 2003/0061344 | A1 | * | 3/2003  | Monroe    | G08B 25/085   |
|           |    |   |         |           | 709/224       |
| 2006/0024415 | A1 | * | 2/2006  | Rado      | A47J 37/1266  |
|           |    |   |         |           | 426/523       |
| 2006/0204059 | A1 | * | 9/2006  | Ido       | B60R 25/25    |
|           |    |   |         |           | 382/118       |
| 2007/0158335 | A1 |   | 7/2007  | Mansbery  |                |
| 2011/0119405 | A1 | * | 5/2011  | Parr      | G06F 13/37    |
|           |    |   |         |           | 710/4         |
| 2011/0151072 | A1 | * | 6/2011  | Anderson  | F24C 7/082    |
|           |    |   |         |           | 426/231       |
| 2012/0003364 | A1 |   | 1/2012  | Kling et al. |             |
| 2012/0239762 | A1 | * | 9/2012  | Fisher    | H04N 21/4108  |
|           |    |   |         |           | 709/206       |
| 2013/0176116 | A1 | * | 7/2013  | Jung      | G08C 17/02    |
|           |    |   |         |           | 340/12.5      |
| 2013/0232451 | A1 | * | 9/2013  | Chen      | G06F 3/0488   |
|           |    |   |         |           | 715/835       |
| 2013/0277353 | A1 | * | 10/2013 | Joseph    | H05B 1/0263   |
|           |    |   |         |           | 219/209       |
| 2013/0302483 | A1 | * | 11/2013 | Riefenstein | F24C 7/085  |
|           |    |   |         |           | 426/233       |
| 2014/0043424 | A1 | * | 2/2014  | Gava      | H04N 21/4126  |
|           |    |   |         |           | 348/14.01     |
| 2014/0082649 | A1 | * | 3/2014  | Harada    | H04N 7/173    |
|           |    |   |         |           | 725/14        |
| 2014/0313328 | A1 | * | 10/2014 | Park      | F25D 29/00    |
|           |    |   |         |           | 348/143       |
| 2014/0339374 | A1 | * | 11/2014 | Mian      | G08G 1/0175   |
|           |    |   |         |           | 246/473.1     |
| 2015/0049250 | A1 | * | 2/2015  | Shao      | H04N 21/4122  |
|           |    |   |         |           | 348/596       |
| 2015/0074237 | A1 | * | 3/2015  | Unagami   | H05B 6/668    |
|           |    |   |         |           | 709/219       |
| 2015/0117704 | A1 | * | 4/2015  | Bulan     | G08G 1/096783 |
|           |    |   |         |           | 382/103       |
| 2015/0220603 | A1 | * | 8/2015  | Bhatt     | G06F 16/338   |
|           |    |   |         |           | 707/722       |
| 2015/0350612 | A1 | * | 12/2015 | Brunson   | G08B 13/19619 |
|           |    |   |         |           | 348/143       |
| 2015/0358520 | A1 | * | 12/2015 | Thimmappa | H04N 5/2256   |
|           |    |   |         |           | 348/217.1     |
| 2016/0057394 | A1 | * | 2/2016  | Marutani  | F25D 23/04    |
|           |    |   |         |           | 348/143       |
| 2016/0213190 | A1 | * | 7/2016  | Doyle     | A47J 41/0072  |
| 2017/0208652 | A1 |   | 7/2017  | Luckhardt et al. |         |

FOREIGN PATENT DOCUMENTS

| DE | 10 2008 042804 A1 | 4/2009 |  |
| EP | 0563698 | 10/1993 |  |
| EP | 2 647 916 A1 | 10/2013 |  |
| EP | 2706704 | 3/2014 |  |
| EP | 3042126 A1 * | 7/2016 | ............... F24H 9/02 |
| WO | 2013/096136 A1 | 6/2013 |  |
| WO | 2013/128532 A1 | 9/2013 |  |
| WO | WO-2014142120 A1 * | 9/2014 | ............. F25D 23/04 |
| WO | 2014/155935 A1 | 10/2014 |  |

OTHER PUBLICATIONS

European Search Report for EP application No. EP22167921.0, dated Jul. 13, 2022, 13 pages.
European Search Report for EP application No. EP22167927.7, dated Jul. 15, 2022, 13 pages.
European Search Report for EP application No. EP22167938.4, dated Jul. 13, 2022, 14 pages.

* cited by examiner

FIG 4

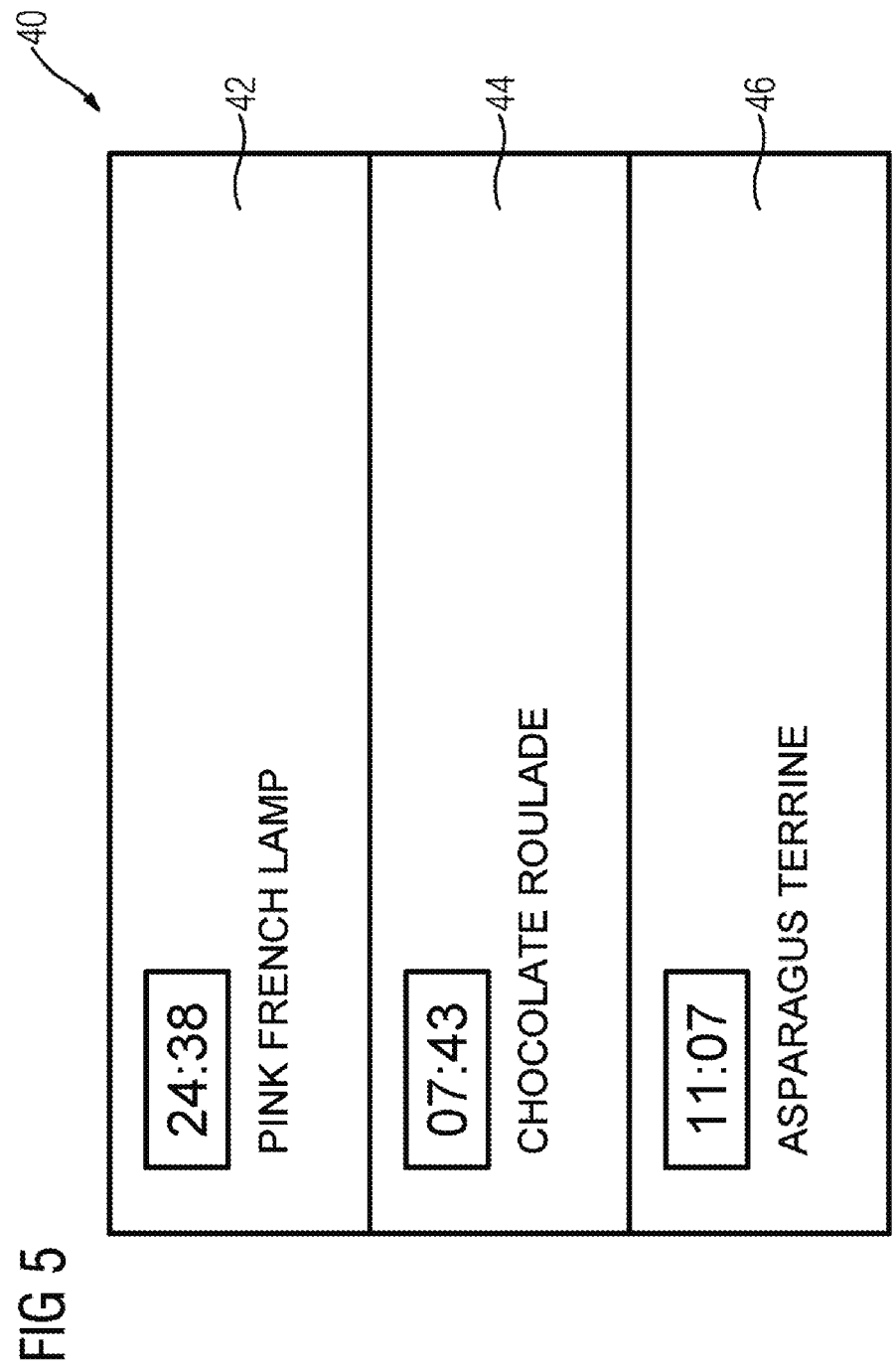

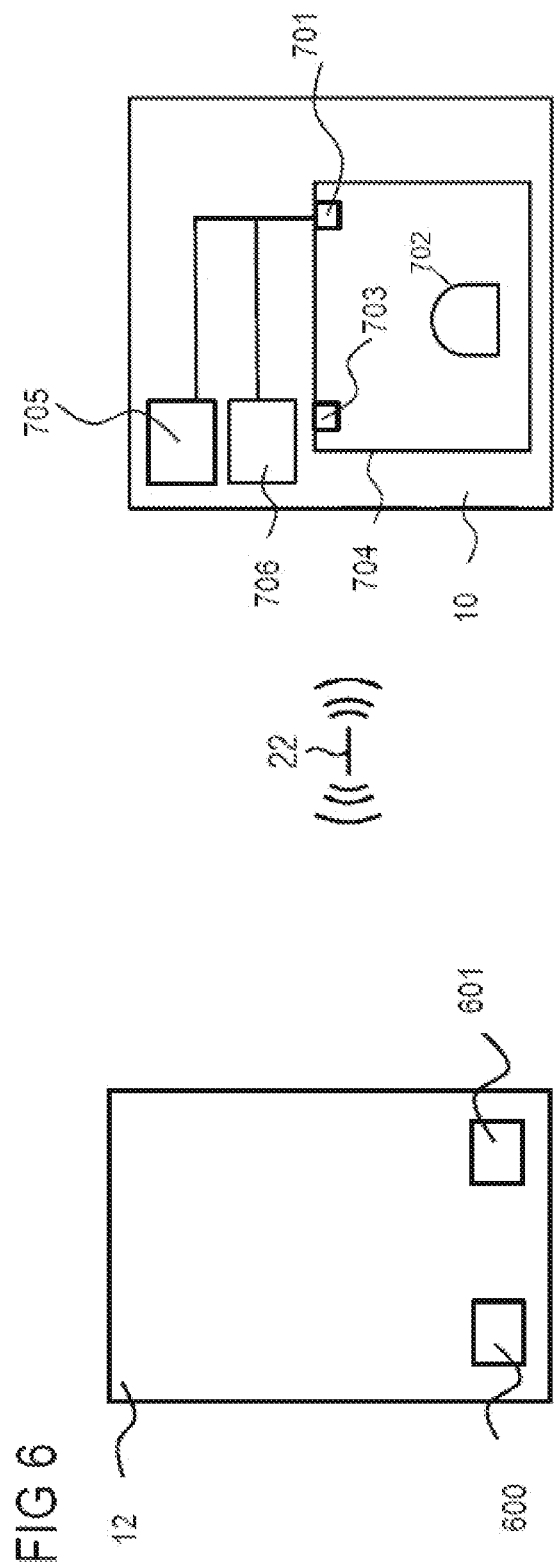
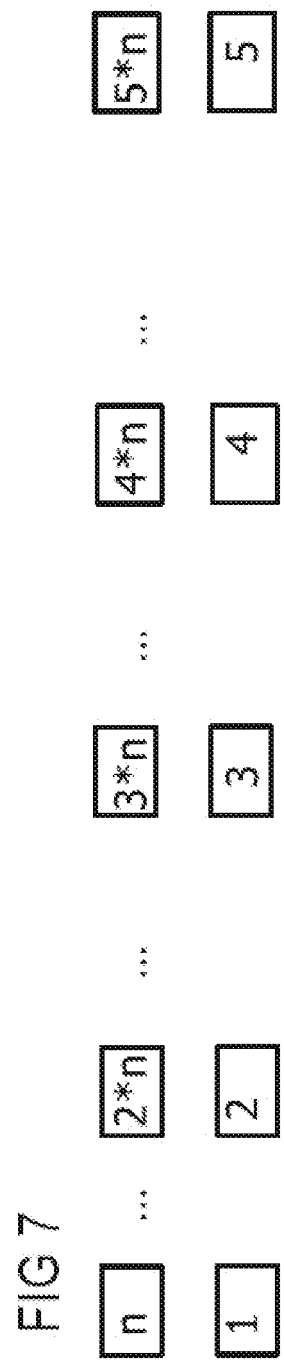

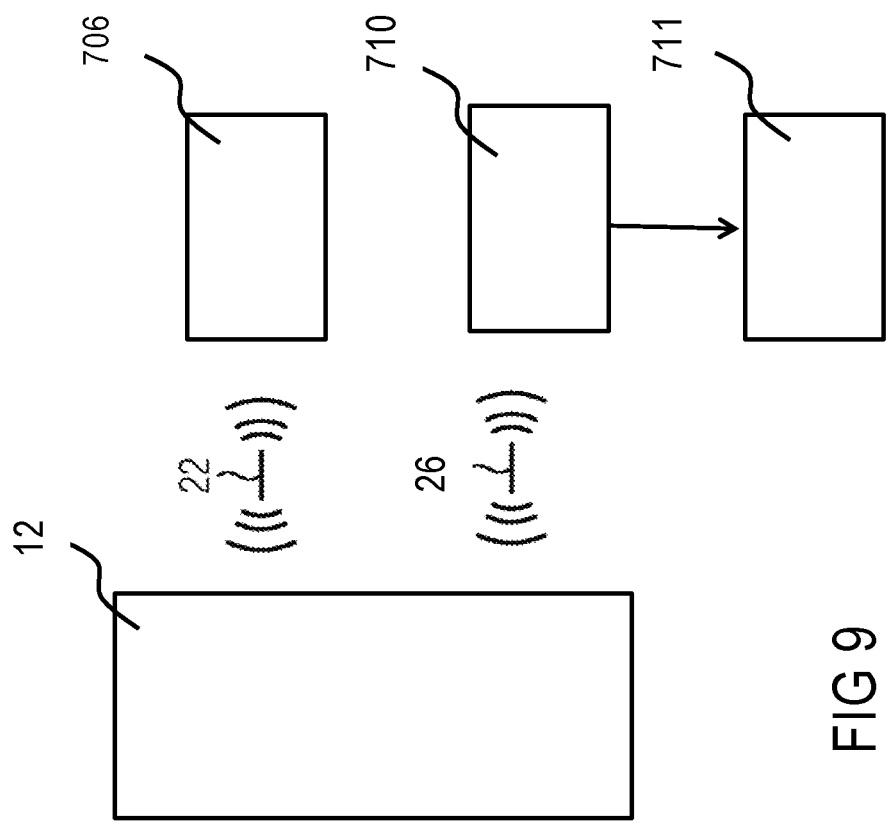
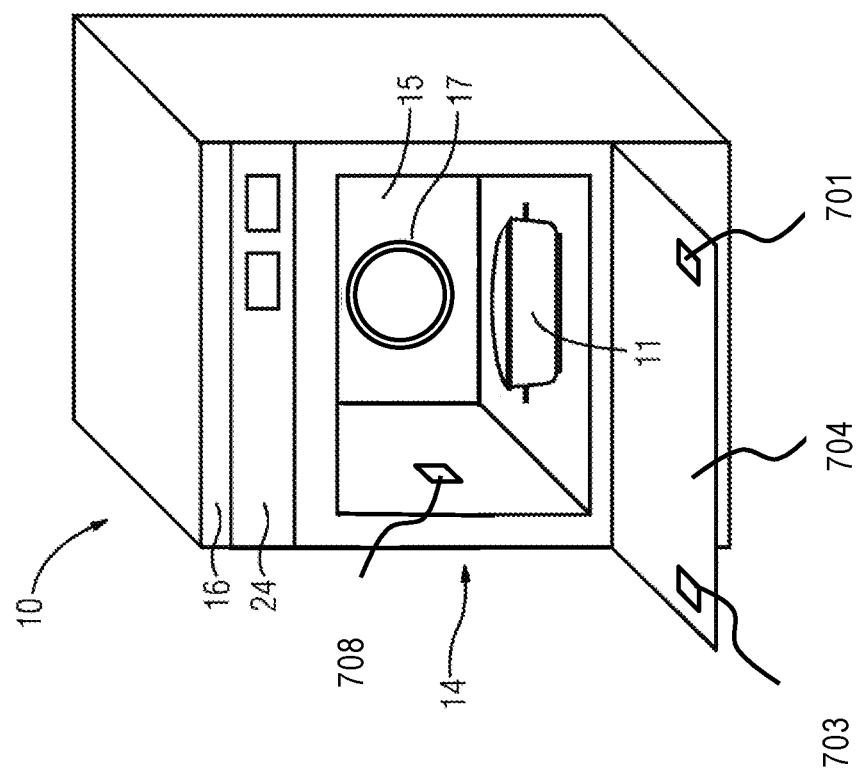

METHOD FOR DATA COMMUNICATION WITH A DOMESTIC APPLIANCE BY A MOBILE COMPUTER DEVICE, MOBILE COMPUTER DEVICE AND DOMESTIC APPLIANCE

The present invention relates to a method for data communication with a domestic appliance by a computer device. Further, the present invention relates to application software for a computer device connected or connectable to a domestic appliance, in particular a cooking appliance including a cooking oven and/or a cooking hob. Moreover, the present invention relates to a domestic appliance, in particular a cooking appliance including a cooking oven with an oven cavity and/or a cooking hob, connected or connectable to a computer device. Additionally, the present invention relates to a computer device connected or connectable to a domestic appliance, in particular a cooking appliance including a cooking oven and/or a cooking hob.

Modern domestic appliances can be connectable to a communication network and/or to a computer device. Said communication network may be the internet or an internal network. These connections of the domestic appliances allow additional options for operating the domestic appliance. For example, the domestic appliances may be controlled by the computer device and/or via the communication network. Additional information provided by the communication network may be used for operating the domestic appliance. In many cases, information from the communication network is up to date.

For the data communication, it can be advantageous or even necessary, that the usability is flexible and/or effectively, so that it can be operated and/or controlled from different locations, for example.

It is an object of the present invention to provide an improved method for data communication with a domestic appliance by a computer device. Especially, it is an object of the present invention to improve the features and/or the usability and/or the effectivity of the data communication.

The object is achieved by the method according to claim 1.

The present invention relates to a method for data communication with a domestic appliance by a mobile computer device, wherein the domestic appliance and the mobile computer device are interconnected or interconnectable via a wireless data connection that is adapted for transferring signals between the domestic appliance and the mobile computer device.

The wireless data connection that is adapted for transferring signals between the domestic appliance and a mobile computer device allows a very flexible and effective use of the data communication with the domestic appliance by a mobile computer device. In particular when the domestic appliance is a cooking appliance, for example a cooking oven with an oven cavity and/or a cooking hob, it is very helpful if it is possible to control the domestic appliance by a wireless data connection which can be operated near the domestic appliance by the mobile computer device. For example, the mobile computer device may be a mobile phone, a smart phone, a tablet personal computer, a netbook or a notebook.

In some embodiments, the domestic appliance can comprise a camera for generating a sequence of images as a video stream for obtaining a video which shows images from the feeding area of the domestic appliance.

Preferably, the domestic appliance comprises an image serving unit, especially a data server, for obtaining the sequence of images as a video stream from the camera and for transferring the video stream to the mobile computer device.

The camera can optionally generate a sequence of images as a video stream, wherein the camera transfers the video stream to the serving unit. Preferably, the mobile computer device receives the video from stream the serving unit.

Preferably, the data serving unit streams videos with image rate between 1 image per second and 10 images per second, preferably between 3 images per second and 6 images per second.

The image serving unit streams, in some embodiments, videos with an image width resolution between 500 and 2.000 pixels, preferably with an image width resolution between 800 and 1.500 pixels.

The data serving unit streams, in some embodiments, videos with an image height resolution between 500 and 1.500 pixels, preferably with an image height resolution between 800 and 1.300 pixels.

Preferably, the mobile computer device can be switched into a first connection state with the domestic appliance. More preferably, in the first transmission state, video streaming is enabled by the domestic appliance and the mobile computer device.

The mobile computer device can optionally be switched into a second transmission state with the domestic appliance, wherein in the second connection state no video streaming is enabled by the domestic appliance and the mobile computer device.

The domestic appliance comprises, as a further option, a switching element, especially a door switching element, wherein the mobile computer device can be switched from the second to the first transmission state by the switching element.

Preferably, the door switching element is operated by opening the door and/or by closing the door, wherein with open door, the door switching element is in an open position, wherein with closed door, the door switching element is in a closed position.

Changing from open position to closed position can trigger a closing signal, wherein changing from closed position to position can trigger an opening signal.

Preferably, the camera has an operating state where images are transferred, wherein the camera has a standby state where no images are transferred.

The door switching element can, in some embodiments, enable and/or disable the camera so that the camera starts when the door is closed and/or stops when the door is opened.

When an opening signal is received by the camera and the camera is in operating state, a standby signal can optionally be generated within the camera to shift the camera into the standby state.

When a closing signal is received by the camera and the camera is in standby state, a wakeup signal can optionally be generated within the camera to shift the camera into the operating state.

When a wakeup signal is generated within the camera and the camera is in standby state, and an oven light is turned off, a power signal can, in some embodiments, be transferred to the oven light which turns the oven light on.

Preferably, the image serving unit forwards images to the mobile computer device. Preferably, the mobile computer device transmits the images to an image distributing unit, wherein the image distributing transmits the images to a client computer.

The mobile computer device comprises in some embodiments a switching device for generating a wakeup signal, wherein the wakeup signal is transferred to the image serving unit via a wireless network.

The serving unit preferably transfers the wakeup signal to the camera to change into the operating state, whereinafter the serving unit transfers videos to the mobile computer device via the wireless network.

After a predefined time, especially after two minutes, the mobile computer device can preferably generate a standby signal, wherein the standby signal is transferred to the data serving unit, via the wireless network.

The serving unit can optionally transfer the standby signal to the camera to change into the standby state.

Preferably, the serving unit comprises a first serving device, especially an image serving device, especially a first WiFi node, wherein the serving unit, comprises a second serving device, especially a data serving device, especially a second WiFi node.

From the received images, the mobile computer device can optionally select a sequence of images, wherein between at least two of successive selected images, a predefined number of images is not selected.

Preferably, the predefined length of images is 5, 10, 20 or 100.

Between at least half of two successive selected images, the predefined number of images is, in some embodiments, not selected or between all selected images, the predefined number of images is not selected.

Before the first image and after the last image, additional images are inserted in some embodiments. Preferably, the image sequence is passed to an image distributing unit.

Preferably, the method comprises the steps of:
  detecting visually at least one object being treated by the domestic appliance,
  generating a picture signal of the object being treated by the domestic appliance,
  transferring the picture signal from the domestic appliance to the mobile computer device via the wireless connection, and
  displaying a picture of the object being treated by the domestic appliance on a display or touch screen of the mobile computer device on the basis of the picture signal.

Therefore, the object being treated by the domestic appliance can especially represented or representable in real-time on the display or touch screen of the mobile computer device.

The wireless data connection between the domestic appliance and the mobile computer device can provide a representation of the object in real-time. The real-time representation of the object being treated by the domestic appliance on the display of the mobile computer device provides information about the actual state of said object from a distance.

According to a preferred embodiment, the domestic appliance is a cooking appliance including a cooking oven and/or a cooking hob, said object being treated by the domestic appliance is a food stuff being treated by the cooking appliance, in particular a food stuff being treated in an oven cavity of a cooking oven, and said wireless data connection is at least a unidirectional data connection for transferring signals form the cooking appliance to the mobile computer device for allowing monitoring in real time by a user of the visual appearance of said food stuff being treated by the cooking appliance on the display or touchscreen of said mobile computer device.

Preferably, at least one current operating parameter of the domestic appliance is transferred between the domestic appliance and the mobile computer device via the wireless data connection, in particular wherein said at least one current operating parameter of the domestic appliance is indicated by the display or touch screen of the mobile computer device and/or wherein said at least one current operating parameter of the domestic appliance can be set by a user via said display or touch screen of the mobile computer device. The indication of current operating parameters increases the user's level of information.

In particular, the at least one current operating parameter of the domestic appliance is represented by a numerical value and/or by one or more graphical symbols on the display or touch screen of the mobile computer device. For example, the graphical symbols may represent numerical values by different sizes of an area or by the characteristic colours.

According to one embodiment, the domestic appliance is a cooking appliance, wherein the temperature of at least one food stuff being treated by the cooking appliance is detected by said cooking appliance, at least one corresponding temperature signal is transferred to the mobile computer device via the wireless data connection in real-time, and at least one corresponding temperature value is indicated by the mobile computer device. The view of the food stuff and the knowledge of the temperature provide broad information of the cooking process.

Further, the domestic appliance is a cooking appliance, wherein an elapsed cooking time and/or a remaining cooking time of at least one food stuff being treated by the cooking appliance is transferred to the mobile computer device via the wireless data connection in real-time and indicated by the mobile computer device.

Additionally, the at least one operating parameter of the domestic appliance, preferably at least one current parameter of the domestic appliance, is evaluated by the mobile computer device and the obtained result is indicated on the display or touch screen of the mobile computer device, wherein said result includes a history and/or a statistical analysis of said at least one operating parameter of the domestic appliance and/or further corresponding information relating to said history and/or statistical analysis.

Optionally, the mobile computer device is connected or connectable to the internet via a wireless data connection, in particular via a wireless data local area network ("WLAN") and/or a mobile communications network, wherein the mobile computer device is connected or connectable to at least one social network and/or to at least one data base. The connection of the domestic appliance to the internet allows additional options for operating said domestic appliance.

According to a further embodiment, the wireless data connection between the domestic appliance and the mobile computer device is a bidirectional connection transferring signals between the domestic appliance and the mobile computer device, wherein the domestic appliance is controlled or controllable by the user via the mobile computer device. The wireless bidirectional connection between the domestic appliance and the mobile computer device allows a remote control of said domestic appliance.

The present invention relates further to application software for a mobile computer device connected or connectable to a domestic appliance, in particular a cooking appliance including a cooking oven and/or a cooking hob, wherein the application software is provided for performing the method mentioned above. The use of application software allows a plurality of additional features by low complexity.

According to one example, the application software provides a recipe generator for a cooking appliance, wherein a user may input or select one or more search criteria for a cooking recipe and the recipe generator provides at least one corresponding proposal for a cooking recipe, and wherein a plurality of cooking recipes are stored in a memory of the mobile computer device and/or in a data base of the internet.

Optionally, said one or more search criteria for a cooking recipe are selectable by the user from a group comprising at least one recipe food ingredient type, at least one recipe food ingredient amount, at least one cooking or baking temperature, at least one cooking or baking duration and/or at least one generic cooking mode such as radiation cooking, forced convection cooking, steam cooking, microwave cooking or induction cooking, and the application software comprises at least one algorithm for selecting said at least one corresponding proposal for a cooking recipe from said plurality of stored recipes on the basis of said selection by the user of at least one of said search criteria for a cooking recipe.

Moreover, the application software may comprise an algorithm for adapting at least one recipe parameter of at least one of said plurality stored cooking recipes to an operational feature of the cooking appliance.

In this case, said recipe parameter may be at least one of said recipe food ingredient amount, cooking or baking temperature, cooking or baking duration, and/or generic cooking mode and/or wherein said operational feature of the cooking appliance is a volume of an oven cavity of the cooking appliance, a calorific output of at least one heating element of the cooking appliance and/or a calorific output of a cooking mode of the cooking appliance such as a mode of the cooking appliance for radiation cooking, for forced convection cooking, for steam cooking, for microwave cooking or for induction cooking.

Further, the application software may comprise an algorithm for adapting at least one operational parameter of the cooking appliance according to said at least one recipe parameter of the cooking recipe that has been selected by the user from said proposal by said recipe generator for a cooking recipe, in particular wherein said at least one operational parameter of the cooking appliance is a cooking or baking temperature, a cooking or baking duration and/or a mode of the cooking appliance for radiation cooking, for forced convection cooking, for steam cooking, for microwave cooking or for induction cooking.

According to another example, the application software provides a multi-timer function for two or more dishes and/or courses in or on the cooking appliance, wherein said dishes and/or courses can be treated together at the same temperature by the cooking appliance, in particular together in the same oven cavity at the same temperature, but can require different cooking durations, and wherein the elapsed and/or remaining cooking durations of individual dishes and/or courses are indicated by the display or touch screen of the mobile computer device.

According to a further example, the application software provides a cooking time reduction function and/or a cooking temperature reduction function, wherein a user may reduce the cooking time and/or the cooking temperature of the cooking appliance by the mobile computer device via the wireless bidirectional data connection between the domestic appliance and the mobile computer device. In this case, the user can reduce the cooking time and/or the cooking temperature, but not increase said cooking time and/or the cooking temperature, respectively. This contributes to the safety of the cooking process.

Further, the present invention relates to a domestic appliance, in particular a cooking appliance including a cooking oven with an oven cavity and/or a cooking hob, connected or connectable to a mobile computer device via a wireless connection, wherein the domestic appliance is provided for the aforesaid method.

The domestic appliance comprises preferably at least one camera, in particular a camera arranged to detect visually and to provide a picture signal of said food stuff being treated by said cooking appliance in said oven cavity or on said coking hob.

Moreover, the present invention relates to a mobile computer device connected or connectable to a domestic appliance, in particular a cooking appliance including a cooking oven and/or a cooking hob, via a wireless data connection, wherein the mobile computer device comprises at least one display and/or touch screen, wherein the mobile computer device is provided for the method mentioned above and/or the mobile computer device supports aforesaid application software.

At last, the present invention relates to a computer program stored in a computer usable medium, comprising computer readable program means for causing a computer to perform the method mentioned above, wherein the computer program includes aforesaid application software.

Novel and inventive features of the present invention are set forth in the appended claims.

The present invention will be described in further detail with reference to the drawings, in which FIG. 1 illustrates a schematic view of a domestic appliance and a mobile computer device according to a preferred embodiment of the present invention, FIG. 2 illustrates a schematic perspective view of the domestic appliance according to the preferred embodiment of the present invention, FIG. 3 illustrates a schematic view of an example for a main page of application software ("APP") for the mobile computer device according to the preferred embodiment of the present invention, FIG. 4 illustrates a schematic view of an example for a page of a recipe generator of the application software ("APP") for the mobile computer device according to the preferred embodiment of the present invention, and FIG. 5 illustrates a schematic view of an example for a page of a multi-timer function of the application software ("APP") for the mobile computer device according to the preferred embodiment of the present invention.

FIG. 6 illustrates a schematic view of an example for a domestic appliance and a mobile computer device according to a preferred embodiment of the present invention and FIG. 7 illustrates a schematic view of image sequences according to a preferred embodiment of the present invention.

FIG. 8 illustrates a schematic view of an example for a domestic appliance according to a preferred embodiment of the present invention and FIG. 9 illustrates a schematic view of an example for a mobile computer device and serving units according to a preferred embodiment of the present invention.

Figure 1:
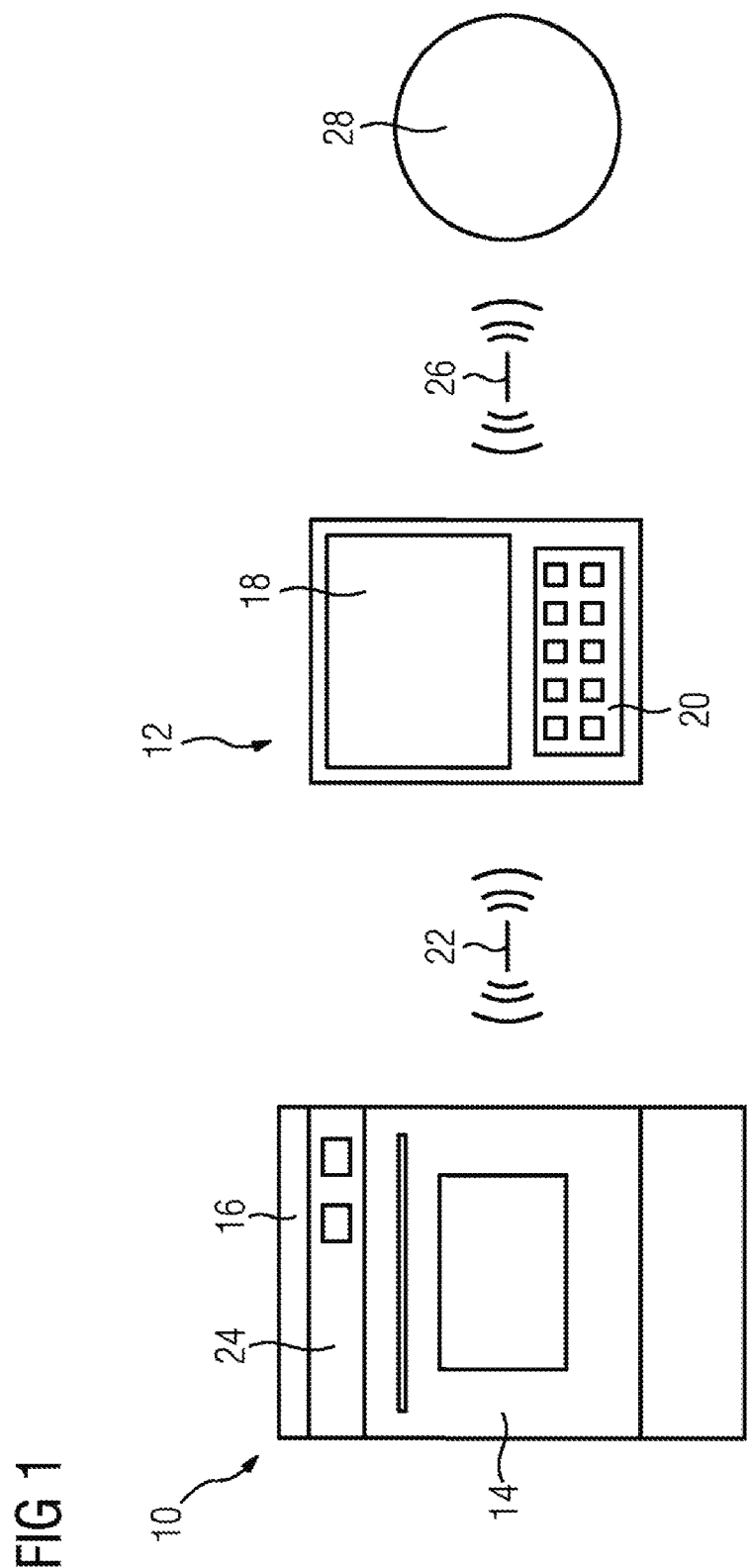

FIG. 1 illustrates a schematic view of a domestic appliance 10 and a mobile computer device 12 according to a preferred embodiment of the present invention. In this example, the domestic appliance is a cooking appliance 10 including a cooking oven 14 and a cooking hob 16, wherein the cooking hob 16 is arranged above the cooking oven 14. Alternatively, the cooking appliance 10 may only include either the cooking oven 14 or the cooking hob 16. In this example, the domestic appliance or the cooking appliance 10, respectively, includes a stationary control unit 24. In general, the domestic appliance 10 may be an arbitrary appliance, which is monitored and/or controlled by the user via the mobile computer device 12.

Further, the cooking device 10 comprises one or more cameras not shown in FIG. 1. For example, the camera is arranged in or in front of an oven cavity of the cooking oven 14, so that food stuff inside the oven cavity may be monitored by the user. Further, the camera may be arranged above the cooking hob 16, so that food stuff on said cooking hob 16 may be monitored by the user. In the latter case, the camera may be attached at an exhaust hood arranged above the cooking hob 16.

Moreover, the cooking device 10 may comprise at least one temperature sensor for detecting the temperature of the food stuff and/or in the oven cavity and/or in a cooking pot.

The mobile computer device 12 includes a display 18 or a touch screen 18. Further, the mobile computer device 12 includes a keyboard 20. The display 18 forms an output unit of the mobile computer device 12. The keyboard 20 forms an input unit of the mobile computer device 12. The touch screen 18 forms an input/output unit of the mobile computer device 12. If the display 18 is formed as the touch screen 18, then the mobile computer device 12 does not need necessarily the keyboard 20.

The mobile computer device 12 may be a customary device. For example, the mobile computer device 12 may be a mobile phone, a smart phone, a tablet personal computer, a netbook or a notebook.

There is a wireless data connection 22 between the cooking appliance and the mobile computer device 12. According to one embodiment said wireless data connection 22 is unidirectional, wherein signals may be transferred only from the domestic appliance to the mobile computer device 12. In this case, the user is able to monitor a working process of the cooking appliance 10 by the mobile computer device 12. According to another embodiment the wireless data connection 22 is bidirectional, wherein signals may be transferred from the domestic appliance 10 to the mobile computer device 12 as well as from the mobile computer device 12 to the domestic appliance 10. In the latter case, the user is able to control the working process of the cooking appliance by the mobile computer device 12. If the wireless data connection 22 between the cooking appliance 10 and the mobile computer device 12 is unidirectional, then the user may control the domestic appliance 10 by the stationary control unit 24 of the domestic appliance 10. If the wireless data connection 22 between the cooking appliance 10 and the mobile computer device 12 is bidirectional, then the user may control the domestic appliance by the mobile computer device 12 and/or the stationary control unit 24.

The cooking appliance 10 and the mobile computer device 12 may be interconnected or interconnectable via the internet. For example, the cooking appliance 10 is connected or connectable to the internet via a local area network (LAN) or a wireless local area network (WLAN) to the internet. The mobile computer device 12 may be connected or connectable to the internet via a wireless local area network (WLAN) or a mobile communications network.

Alternatively, the wireless data connection 22 between the cooking appliance 10 and the mobile computer device 12 may be realized via a radio contact. Further, the cooking appliance 10 and the mobile computer device 12 may be interconnected or interconnectable via infrared signals. In general, an arbitrary wireless data connection 22 between the cooking appliance 10 and the mobile computer device 12 is possible. Preferably, the selection of the type of the wireless data connection 22 between the cooking appliance 10 and the mobile computer device 12 depends on the favoured operating distance.

The display 18 and/or the touch screen 18 of the mobile computer device 12 are provided for indicating current pictures recorded by the camera of the cooking device 10. The wireless data connection 22 from the cooking appliance 10 to the mobile computer device 12 is provided for transferring picture signals in real time.

In a similar way, the display 18 and/or the touch screen 18 of the mobile computer device 12 are provided for indicating current temperature values detected by the temperature sensor of the cooking device 10. The wireless data connection 22 from the cooking appliance 10 to the mobile computer device 12 is provided for transferring temperature signals in real time.

Optionally, there is an external connection 26 between the mobile computer device 12 and the internet 28. Preferably, the mobile computer device 12 is connected to the internet 28 via the wireless local area network (WLAN) or the mobile communications network. The external connection 26 allows communications between the mobile computer device 12 and the internet 28. For example, the mobile computer device 12 may use applications provided by the internet 28. Further, the user is able to download software for the mobile computer device 12 from the internet 28. Moreover, the user can access to data bases in the internet 28 by the mobile computer device 12.

All in all there are four possible different constellations in view of the wireless data connection 22 and the external connection 26. According to a first constellation the wireless data connection 22 is unidirectional from the cooking appliance 10 to the mobile computer device 12, wherein the external connection 26 lacks. According to a second constellation the wireless data connection 22 is bidirectional between the cooking appliance 10 and the mobile computer device 12, wherein the external connection 26 lacks. According to a third constellation the wireless data connection 22 is unidirectional from the cooking appliance 10 to the mobile computer device 12, wherein the external connection 26 exists between the mobile computer device 12 and the internet 28. According to a fourth constellation the wireless data connection 22 is bidirectional between the cooking appliance and the mobile computer device 12, wherein the external connection 26 exists between the mobile computer device 12 and the internet 28. In the first and second constellations the wireless data connection 22 between the cooking appliance 10 and the mobile computer device 12 may be realized via the internet, although the external connection 26 between the mobile computer device 12 and the internet 28 lacks.

Figure 2:
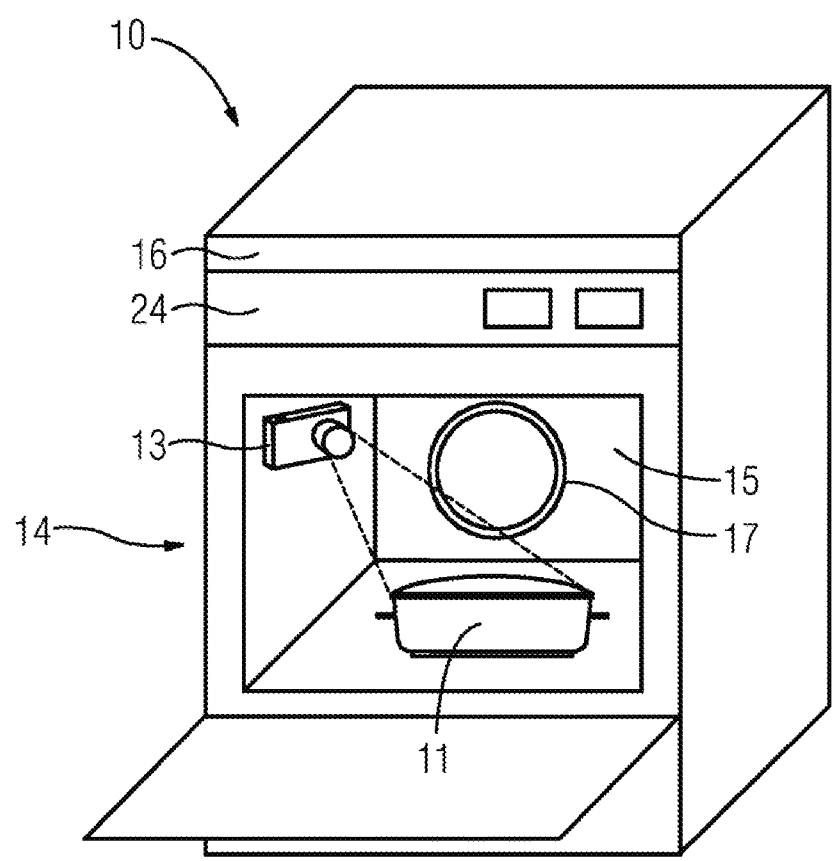

FIG. 2 illustrates a schematic perspective view of the domestic appliance 10 according to the preferred embodiment of the present invention, wherein the domestic appliance is the cooking appliance 10. Said cooking appliance 10 includes the cooking oven 14 with an oven cavity 15 and the cooking hob 16, wherein the cooking hob 16 is arranged above the cooking oven 14.

Food stuff 11 being treated by the cooking appliance 10 is arranged inside the oven cavity 15. A heating element 17 is arranged at a rear wall of the oven cavity 15. The cooking appliance comprises a camera 13. Said camera 13 is provided for detecting visually the food stuff 11 being treated by the cooking appliance 10. The camera 13 provides a picture signal of said food stuff 11. The camera 13 may be arranged in or in front of the oven cavity 15 of the cooking oven 14, so that the food stuff 11 inside the oven cavity 15 may be monitored by the user. Alternatively, the camera 13 may be arranged above the cooking hob 16, so that food stuff 11 on said cooking hob 16 may be monitored by the user. In the latter case, the camera 13 may be attached at an exhaust hood arranged above the cooking hob 16.

The present invention provides application software ("APP") for the mobile computer device 12. Said application software comprises one or more functions and/or features supporting the operations of the mobile computer device 12. Several functions and features of the application software are described below.

Figure 3:
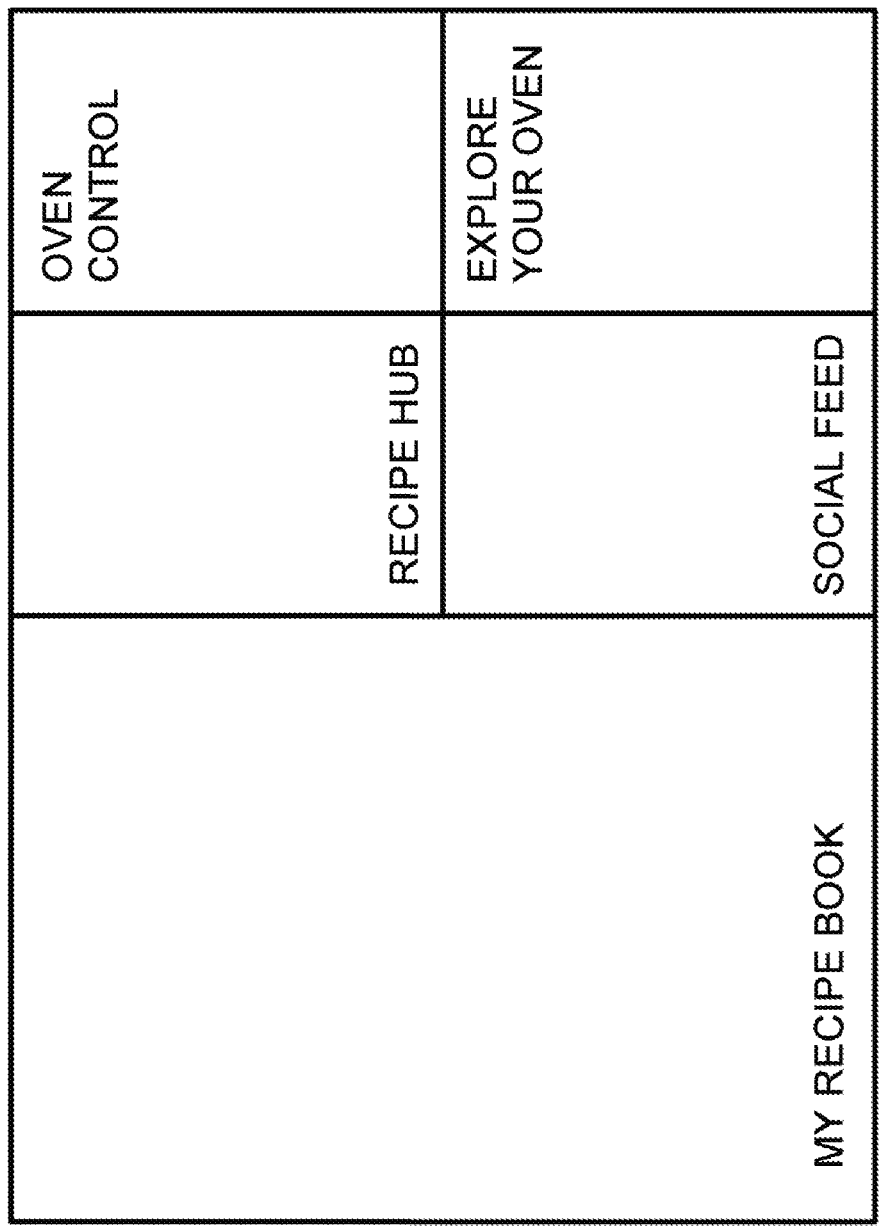

FIG. 3 illustrates a schematic view of an example for a main page 30 of application software ("APP") for the mobile computer device according to the preferred embodiment of the present invention. Said main page 30 may be indicated by the display 18 or touch screen 18. In this example, the area of the main page is subdivided into five subareas. The area of the main page represents a menu, while the five subareas represent a menu item in each case. In this embodiment, the menu items correspond with the functions "my recipe book", "recipe hub", "social feed", "oven control" and "explore your oven".

The function "my recipe book" allows the generation and administration of an individual recipe book by the user. Said individual recipe book may be generated on the basis of a recipe book provided by the manufacturer of the cooking appliance 10, mobile computer device 12 and/or application software. Recipes generated by the user may be inserted into the function "my recipe book".

The function "recipe hub" allows the selection of recipes from a data base. The user may input a number of criteria for the desired recipe. The function "social feed" allows the access to a social network, cooking sites and/or cooking blogs. The function "explore your oven" allows an access to manuals in order to obtain satisfactory results.

The function "oven control" allows an adjusting of cooking parameters for the cooking appliance 10 by the mobile computer device 12. The function "oven control" requires the bidirectional wireless connection 22 between the cooking appliance 10 and the mobile computer device 12.

According to one embodiment, the application software ("APP") comprises a viewing function. Said viewing function allows the representation of a picture signal from the camera 13 of the cooking appliance 10 on the display 18 or touch screen 18 of the mobile computer device 12. The viewing function allows a current viewing of the food stuff 11 in the oven cavity 15 of the cooking oven 14 and/or on the cooking hob 16 on the display 18 or touch screen 18 of the mobile computer device 12. A real-time transmission of pictures from the camera 13 of the cooking appliance to the display of the mobile computer device 12 is possible. Thus, the user is able to monitor the food stuff 11 in the oven cavity 15 of the cooking oven 14 and/or on the cooking hob 16 of the cooking appliance 10 from a distance by the mobile computer device 12. The user is always able to inform about the current state of the food stuff 11 in or on the cooking appliance 10.

If the wireless connection 22 between the cooking appliance 10 and the mobile computer device 12 is unidirectional, wherein the picture signals are transferred from the domestic appliance 10 to the mobile computer device 12, then the user is able to monitor the cooking process of the cooking appliance 10 by watching the picture or pictures of the food stuff 11 on the display 18 or touch screen 18 of the mobile computer device 12. In this case, the user can control the cooking process by the stationary control unit 24 of the cooking appliance 10. The unidirectional wireless connection 22 between the cooking appliance 10 and the mobile computer device 12 has the advantage that the cooking process of the cooking appliance 10 cannot be disturbed by external signals.

If the wireless connection 22 between the cooking appliance 10 and the mobile computer device 12 is bidirectional, wherein the picture signals are transferred from the domestic appliance 10 to the mobile computer device 12 and control signals are transferred from the mobile computer device 12 to the domestic appliance 10, then the user is able to control the working process of the cooking appliance 10 by handling the mobile computer device 12. The bidirectional wireless connection 22 between the cooking appliance 10 and the mobile computer device 12 has the advantage that the user can control the cooking process of the cooking appliance from a relative big distance.

According to another embodiment, the application software ("APP") comprises a recipe generator. The recipe generator generates a proposal for one or more recipes. After the user has input or selected one or more search criteria for the favoured cooking recipe, then the recipe generator provides one or more corresponding proposals for at least one cooking recipe from a data base. Said data base may be stored in a memory of the mobile computer device 12 or provided by the internet.

For example, the recipe generator provided by the application software ("APP") comprises the following steps. In a first step the user inputs directly an ingredient of the favoured recipe. For example, the user selects a kind of meat, e.g. "beef", "pork", "duck" or "chicken", from a menu "meat" or kind of vegetable from a menu "vegetables". Further examples selectable by the user are "casserole", "soup", "dessert", "bread", "cake" and/or "cookies".

Figure 4:
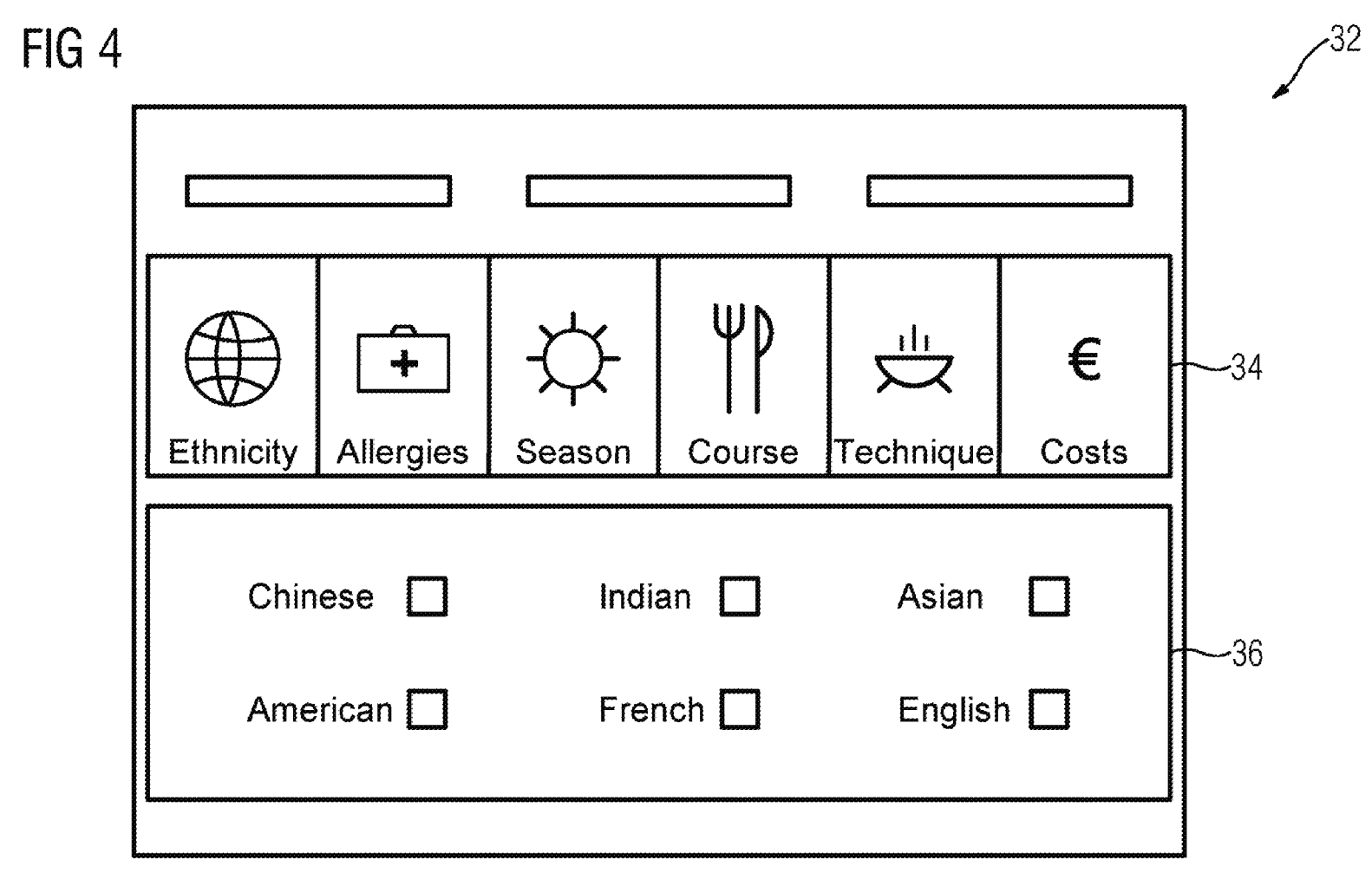

In a second step the user may select further search criteria by menu items. FIG. 4 illustrates a schematic view of an example for a page 32 of the recipe generator of the application software ("APP") for the mobile computer device 12 according to the preferred embodiment of the present invention. Said page 32 comprises an upper menu 34 and a lower menu 36.

In the this example, the upper menu 34 comprises the menu items "ethnicity", "allergies", "season", "course", "technique" and "costs". The menu items of the lower menu 36 depend on the selection in the upper menu 34. If the user has selected the menu item "ethnicity" in the upper menu 34 for example, then the user can further select between the menu items "American", "Chinese", "French", "Indian", "Asian", "English" and they like in the lower menu 36. The selection of the menu item "allergies" may provide a table of typical food allergies. The selection of the menu item "season" may relate to culinary seasons. The selection of the menu item "course" allows the selection of the number of courses of the menu. The selection of the menu item "technique" provides a selection of the technical method of the cooking process, e.g. top heat, bottom heat, top and bottom heat, circulating air, full steam, half steam plus heat, quarter steam plus heat, grill and/or low temperature cooking.

In a next step, the recipes found by the application software are indicated on the display 18 or touch screen 18 of the mobile computer device 12, so that the user may select one of the found recipes. The parameters of the corresponding cooking process are adjusted automatically. At last, the user may activate a start function of the cooking process by operating the keyboard 20 or touch screen 18.

Additionally, the application software ("APP") allows food pairing, wherein the main ingredients and/or main aromas of a dish are determined and groups of main ingredients and/or main aromas harmonizing with each other are defined. Said food pairing comprises the following steps.

After selecting a first dish and the function "food pairing" by the user, predefined further dishes are proposed by the application software ("APP"), wherein said further dishes harmonize with the first dish in view of the ingredients and/or aromas. Optionally, the user may restrict the further dishes by selecting "next course", "prior course", "side dish" or "main dish".

Furthermore, the function "food pairing" may be supported by a database including dishes and/or courses, wherein the main ingredients and/or main aromas of said dishes and/or courses harmonize with each other.

According to a further embodiment, the application software ("APP") comprises a function "shopping list". The function "shopping list" may be activated by the user and generates a list of ingredients required for the selected dish or dishes. The generated shopping list may be edited by the user. For example, the shopping list may by printed in hardcopy form and/or used for an online order.

According to another embodiment, the application software ("APP") comprises a recipe converter. Said recipe converter allows an automatic conversion and indication of the cooking time and/or the temperature from one heating method to another, for example from a conventional heating method, e.g. top and bottom heat or circulating air, to a steam heating method.

Further, the application software ("APP") may comprise a recipe recognition function. Said recipe recognition function allows the identification of signs, i.e. numbers and/or letters, in recipe data bases of different origins. For example, the recipe recognition function is able to recognize signs in a text file, e.g. PDF file, made of scanned-in hand-written documents. The recipe recognition function is provided for recognizing the ingredients, their amounts, the cooking time, the cooking temperature and/or the way of heating. Further, the recipe recognition function may provide proposals for alternative ways of heating. Optionally, the cooking parameters are converted for the alternative way of heating.

In particular, the application software ("APP") may comprise a communication basis for one or more social networks. For example, the communication basis is provided for exchanging experiences and information about the recipes. There are several social networks providing a forum for themes related to cooking. Some social networks provide recipes, which may be directly or indirectly integrated into the application software ("APP") or a corresponding data base.

According to another embodiment, the application software ("APP") comprises a parameter display function for indicating information about the oven parameters. In particular, the parameter display function indicates the current way of heating, the current temperature, the elapsed time and the remaining time. Further, the parameter display function may provide indications for necessary activities of the cooking process. Preferably, a warning before the end of the cooking duration may be indicated, for example ten minutes before the end of the cooking time. Furthermore, a warning may be indicated in order to turn-over the food stuff 11, for example roast or poultry, by the user. Also, a warning for filling up a water tank for a steam cooker may be indicated.

According to a further embodiment, the application software ("APP") comprises a multi-timer function. Said multi-timer function is applicable to a cooking process, wherein different dishes and/or courses are prepared simultaneously at the same temperature, in particular in the same oven cavity 15 of the cooking oven 14. The different dishes and/or courses are cooked at the same temperature, but with diverse cooking durations. The cooking process is performed at relative low temperatures. The multi-timer function of the application software provides a separate timer for each dish or course. For example, the user may adjust the timer directly for the single dishes and/or courses. Then, the elapsed times and/or remaining times are indicated.

Optionally, a warning signal is indicated before the end of the cooking duration. If the different dishes and/or courses shall be finished at the same time, then they have to be inserted into the oven cavity 15 at different times. In this case, a warning signal may be indicated at the points in time, when the single dishes and/or courses should be inserted into the oven cavity 15.

FIG. 5 illustrates a schematic view of an example for a page of the multi-timer function of the application software ("APP") for the mobile computer device 12 according to the preferred embodiment of the present invention. The page of the multi-timer function may be represented by the display 18 or touch screen 18 of the mobile computer device 12. In this example, the page 40 of the multi-timer function indicates remaining cooking times for three different dishes and/or courses prepared in the same oven cavity 15 at the same temperature. The area of the page 40 is subdivided into three subareas 42, 44 and 46. Each subarea 42, 44 and 46 indicates the remaining cooking time and the name of the corresponding dish or course. In this example, a first subarea 42 indicates the dish "Pink French Lamb" and its remaining cooking time, a second subarea 44 indicates the dish "Chocolate Roulade" and its remaining cooking time, and a third subarea 46 indicates the course "Asparagus Terrine" and its remaining cooking time.

FIG. 6 illustrates a schematic view of an example for a domestic appliance 10 and a mobile computer device 12 according to the present invention.

FIG. 7 illustrates a schematic view of image sequences according to the present invention. FIG. 8 illustrates a schematic view of an example for a domestic appliance 10 according to the present invention.

The domestic appliance 10 comprises a camera 701 for generating a sequence of images as a video stream for obtaining a video which shows images from the feeding area 702 of the domestic appliance 10.

The domestic appliance 10 comprises a serving unit 705, 706, especially a data server, for obtaining the sequence of images as a video stream from the camera 701 and for transferring the video stream to the mobile computer device 12.

The camera 701 generates a sequence of images as a video stream, wherein the camera 701 transfers the video stream to the serving unit 705, 706. The mobile computer device 12 receives the video from stream the serving unit 705, 706.

The serving unit 705, 706 comprises a first serving device 705, especially a data serving device, especially a first WiFi node, wherein the serving unit 705, 706 also comprises a second serving device 706, especially an image serving device, especially a second WiFi node.

The image serving device 706 streams videos with an image rate between 1 image per second and 10 images per second, preferably between 3 images per second and 6 images per second.

The image serving device 706 streams videos with an image width resolution between 500 and 2.000 pixels, preferably with an image width resolution between 800 and 1.500 pixels.

The image serving unit 706 streams videos with an image height resolution between 500 and 1.500 pixels, preferably with an image height resolution between 800 and 1.300 pixels.

The mobile computer device 12 can be switched into a first connection state with the domestic appliance 10. In the first transmission state, video streaming is enabled by the domestic appliance 10 and the mobile computer device 12.

The mobile computer device 12 can also be switched into a second transmission state with the domestic appliance 10, wherein in the second connection state no video streaming is enabled by the domestic appliance 10 and/or the mobile computer device 12.

The domestic appliance 10 comprises a switching element 703, especially a door switching element, wherein the mobile computer device 12 can be switched from the second to the first transmission state by the switching element.

The door switching element 703 is operated by opening the door and/or by closing the door 704, wherein with open door 704, the door switching element 703 is in an open position, wherein with closed door, the door switching element is in a closed position.

Changing from open position to closed position triggers a closing signal, wherein changing from closed position to position triggers an opening signal.

The camera 701 has an operating state where images are transferred, wherein the camera 701 has a standby state where no images are transferred.

The door switching element 703 enables and/or disables the camera 701 so that the camera starts when the door 704 is closed and/or stops when the door is opened.

When an opening signal is received by the camera 701 and the camera is in operating state, a standby signal is generated within the camera to shift the camera into the standby state.

When a closing signal is received by the camera 701 and the camera is in standby state, a wakeup signal is generated within the camera to shift the camera 701 into the operating state.

When a wakeup signal is generated within the camera 701 and the camera is in standby state, and the oven light 708 is turned off, a power signal is transferred to the oven light 708 which turns the oven light 708 on.

FIG. 9 illustrates a schematic view of an example for a mobile computer device and serving units according to the present invention.

The image serving unit 706 forwards images to the mobile computer device 12. The mobile computer device 12 transmits the images to an image distributing unit 710, wherein the image distributing transmits the images to a client computer 711.

The mobile computer device 12 comprises a switching device 601 for generating a wakeup signal, wherein the wakeup signal is transferred to the image serving unit 706 via a wireless network.

The serving unit 705, 706 transfers the wakeup signal to the camera 701 to change into the operating state, whereinafter the serving unit 706 transfers videos to the mobile computer device 12 via the wireless network.

After a predefined time, especially after 2 to 5 minutes, the mobile computer device 12 generates a standby signal, wherein the standby signal is transferred to the data serving unit 705, 706 via the wireless network.

The serving unit 705, 706 transfers the standby signal to the camera 701 to change into the standby state.

From the received images, the mobile computer device 12 selects a sequence of images, wherein between at least two of successive selected images, at least a predefined number of images is not selected.

The predefined length of images is 5, 10, 20 or 100.

Between at least half of two successive selected images, the predefined number of images is not selected or between all selected images, the predefined number of images is not selected. Before the first image and after the last image, additional images can be inserted.

The image sequence is passed to an image distributing unit 710.

According to another embodiment, the application software ("APP") comprises an "intuitive display function" for indicating the status of the cooking process. For example, in the beginning of the cooking process the background of the display 18 or touch screen 18 or an indicating portion of said display 18 or touch screen 18 is dark. Then a relative small bright area on the display 18 or touch screen 18 or the indicating portion of said display 18 or touch screen 18, respectively, is activated. During the advancing cooking process the bright area becomes bigger. In the end of the cooking process the whole area of the display 18 or touch screen 18 or of the indicating portion of said display 18 or touch screen 18, respectively, becomes bright. Preferably, the bright area is enhanced from left to right. In particular, a characteristic colour for the area becoming brighter is used. The "intuitive display function" allows that the status of the cooking process may be recognized clearly and from a relative big distance.

According to a further embodiment, the application software ("APP") comprises a cooking time reduction function and/or a temperature reduction function. In this case, said cooking time reduction function and temperature reduction function require the bidirectional wireless connection 22 between the cooking appliance and the mobile computer device 12, so that the cooking appliance 10 is controllable by the mobile computer device 12. The user may reduce the cooking time and/or the temperature wirelessly via the mobile computer device 12. There is no doubt about the safety, since the energy supply is reduced. In contrast, there is doubt about the safety, if the cooking time and/or the temperature increase, since very high electric power is operated by remote control.

According to another embodiment, the application software ("APP") comprises a cooking time adjusting function and/or a temperature adjusting function, wherein an increasing of the cooking time and/or the temperature is allowed. For safety reasons the cooking time and/or the temperature may be increased by a slider, which can be activated only by two fingers at the same time. This reduces the danger of an inadvertent activation of said slider.

According to a further embodiment, the application software ("APP") comprises a display function of statistic parameters. For example, the energy consumption of the cooking appliance may be indicated in relation to other parameters. The energy consumption for predetermined time periods may be indicated graphically or by a table. The energy consumption may be indicated in dependence of the types of food stuff 11 of recipes.

According to another embodiment, the application software ("APP") comprises an edit function. The user may input and store an own cooking recipe for his own purposes.

Further, the user may present own cooking recipes in a social network, wherein photographs of the user and/or food stuff 11 may be inserted.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS 10 domestic appliance, cooking appliance
11 object, food stuff
12 mobile computer device
13 camera
14 cooking oven
15 oven cavity
16 cooking hob
17 heating element
18 display, touch screen
20 keyboard
22 wireless data connection
24 stationary control unit
26 external connection
28 internet
30 main page of application software
32 page of recipe generator
34 upper menu
36 lower menu
40 page of multi-timer function
42 first subarea, timer
44 second subarea, timer
46 third subarea, timer
601 switching element
701 camera
702 feeding area
703 door switching element
704 door
705 first serving device
706 second serving device
708 oven light
710 image distributing unit
711 client computer
720 switching device

The invention claimed is:

1. A method for data communication with an oven equipped with a cooking space by a mobile computer device, the method comprising:
interconnecting the oven and the mobile computer device via a wireless data connection that is adapted for transferring signals between the oven and the mobile computer device,
generating, by a camera arranged at an upper side of the cooking space in the oven, a sequence of images as a video stream for obtaining a video which shows cooking process images of a food stuff in the cooking space in the oven,
transmitting the video stream via the wireless data connection from the oven to the mobile computer device,
in response to the oven receiving, from the mobile computer device, a wakeup signal for waking up the camera to transmit the cooking process images of the food stuff in the cooking space in the oven to the mobile computer device via the wireless data connection, shifting the camera into an operating state, and
displaying a plurality of areas on a touch screen of the mobile computer device at a same time, the plurality of areas including a first area for showing a recipe that a user selected and a second area for allowing the user to remotely control cooking parameters of the oven via the wireless data connection,
wherein when an oven door closing signal indicating that an oven door is closed is received by the camera:
the camera is shifted into the operating state, and
the oven turns on an inside light when the camera is activated to stream the cooking process images of the food stuff in the cooking space in the oven to the mobile computer device in response to the oven door closing signal being received, and the inside light is turned off.

2. The method according to claim 1,
wherein the oven comprises a serving unit, especially a data server, for obtaining the sequence of images as a video stream from the camera and for transferring the video stream to the mobile computer device.

3. The method according to claim 2,
wherein the serving unit streams videos with image rate between 1 image per second and images per second.

4. The method according to claim 2,
wherein the serving unit streams videos with an image width resolution between 500 and 2000 pixels,
wherein the serving unit streams videos with an image height resolution between 500 and 1500 pixels.

5. The method according to claim 2,
wherein the serving unit forwards the cooking process images to the mobile computer device,
wherein the mobile computer device transmits the cooking process images to an image distributing unit,
wherein the image distributing unit transmits the cooking process images to a client computer.

6. The method according to claim 2,
wherein the mobile computer device comprises a switching device for generating the wakeup signal,
wherein the wakeup signal is transferred to the serving unit via a wireless network,
wherein the serving unit transfers the wakeup signal to the camera to change into the operating state,
whereinafter the serving unit transfers videos to the mobile computer device via the wireless network,
wherein after a predefined time, especially after 2 to 5 minutes, the mobile computer device generates a standby signal,
wherein the standby signal is transferred to the data serving unit via the wireless network,
wherein the serving unit transfers the standby signal to the camera to change into a standby state.

7. The method according to claim 2,
wherein the serving unit comprises a first serving device, especially a data serving device, especially a first WiFi node,
wherein the serving unit comprises a second serving device, especially an image serving device, especially a second WiFi node.

8. The method according to claim 1,
wherein the camera generates the sequence of images as a video stream,
wherein the camera transfers the video stream to a serving unit,
wherein the mobile computer device receives the video from stream the serving unit.

9. The method according to claim 1,
wherein the mobile computer device can be switched into a first transmission state with the oven,
wherein in the first transmission state, video streaming is enabled by the oven and the mobile computer device.

10. The method according to claim 1,
wherein the mobile computer device can be switched into a second transmission state with the oven,
wherein in the second transmission state no video streaming is enabled by the oven and the mobile computer device.

11. The method according to claim 1,
wherein the oven comprises a switching element, especially a door switching element,
wherein the mobile computer device can be switched from a second transmission state to a first transmission state by the switching element.

12. The method according to claim 11,
wherein the door switching element is operated by opening the oven door and/or by closing the oven door,
wherein with the oven door opened, the door switching element is in an open position,
wherein with the oven door closed, the door switching element is in a closed position.

13. The method according to claim 12,
wherein changing from the open position to closed position triggers a closing signal and/or
wherein changing from the closed position to position triggers an opening signal.

14. The method according to claim 11,
wherein the door switching element enables and/or disables the camera so that the camera starts when the oven door is closed and/or stops when the oven door is opened.

15. The method according to claim 1,
wherein the camera has the operating state where the cooking process images are transferred,
wherein the camera has a standby state where no images are transferred.

16. The method according to claim 1,
wherein when an opening signal indicating that the oven door of the oven is opened is received by the camera and the camera is in the operating state, a standby signal is generated to shift the camera into a standby state.

17. The method according to claim 1,
wherein, from the cooking process images, the mobile computer device selects a predetermined number of images,
wherein between at least two of successive selected images, the predefined number of images is not selected.

18. The method according to claim 17,
wherein the predefined number of images is 5, 10, 20 or 100.

19. The method according to claim 17,
wherein between at least half of two successive selected images, the predefined number of images is not selected or wherein between all selected images, the predefined number of images is not selected.

20. The method according to claim 1,
wherein before a first image in the sequence of images and after a last image in the sequence of images, additional images are inserted and/or
wherein the sequence of images is passed to an image distributing unit.

21. The method according to claim 1, characterized in that the method comprises the steps of:
detecting visually at least one object being treated by the oven,
generating a picture signal of the object being treated by the oven,
transferring the picture signal from the oven to the mobile computer device via the wireless data connection, and
displaying a picture of the object being treated by the oven on a display or the touch screen of the mobile computer device on the basis of the picture signal, so that
the object being treated by the oven is represented or representable in real-time on the display or the touch screen of the mobile computer device.

22. The method according to claim 1, characterized in that the oven is a cooking appliance including a cooking oven and/or a cooking hob, an object being treated by the oven is a food stuff being treated by the cooking appliance, and the wireless data connection is at least a unidirectional data connection for transferring signals form the cooking appliance to the mobile computer device for allowing monitoring in real time by a user of a visual appearance of the food stuff being treated by the cooking appliance on a display or the touch screen of the mobile computer device.

23. The method according to claim 1,
characterized in that
at least one current operating parameter of the oven is transferred between the oven and the mobile computer device via the wireless data connection, wherein the at least one current operating parameter of the oven is indicated by a display or the touch screen of the mobile computer device and/or wherein the at least one current operating parameter of the oven can be set by a user via the display or the touch screen of the mobile computer device.

24. The method according to claim 23,
characterized in that
the at least one current operating parameter of the oven is represented by a numerical value and/or by one or more graphical symbols on the display or touch screen of the mobile computer device.

25. The method according to claim 1,
characterized in that
the oven is a cooking appliance, wherein a temperature of at least one food stuff being treated by the cooking appliance is detected by the cooking appliance, at least one corresponding temperature signal is transferred to the mobile computer device via the wireless data connection in real-time, and at least one corresponding temperature value is indicated by the mobile computer device.

26. The method according to claim 1,
characterized in that
the oven is a cooking appliance, wherein an elapsed and/or a remaining cooking time of at least one food stuff being treated by the cooking appliance is transferred to the mobile computer device via the wireless data connection in real-time and indicated by the mobile computer device.

27. The method according to claim 1,
characterized in that
at least one operating parameter of the oven is evaluated by the mobile computer device and an obtained result is indicated on a display or the touch screen of the mobile computer device, wherein said result includes a history and/or a statistical analysis of said at least one operating parameter of the oven and/or further corresponding information relating to the history and/or statistical analysis.

28. The method according to claim 1, characterized in that
the mobile computer device is connected or connectable to the internet via the wireless data connection, wherein the mobile computer device is connected or connectable to at least one social network and/or to at least one data base.

29. The method according to claim 1, characterized in that
the wireless data connection between the oven and the mobile computer device is a bidirectional connection transferring signals between the oven and the mobile computer device, wherein the oven is controlled or controllable by the user via the mobile computer device.

30. A non-transitory computer-readable medium having stored thereon computer-executable instructions for operating a mobile computer device connected or connectable to an oven including a cooking oven and/or a cooking hob, characterized in that
the computer-executable instructions are provided for performing a method according to claim 1.

31. The non-transitory computer-readable medium according to claim 30, characterized in that
the computer-executable instructions provide a recipe generator for a cooking appliance, wherein a user may input or select one or more search criteria for a cooking recipe and the recipe generator provides at least one corresponding proposal for the cooking recipe, and wherein a plurality of cooking recipes are stored in a memory of the mobile computer device and/or in a data base of the internet.

32. The non-transitory computer-readable medium according to claim 31, characterized in that
the one or more search criteria for a cooking recipe are selectable by the user from a group comprising at least one recipe food ingredient type, at least one recipe food ingredient amount, at least one cooking or baking temperature, at least one cooking or baking duration and/or at least one generic cooking mode such as radiation cooking, forced convection cooking, steam cooking, microwave cooking or induction cooking, and the computer-executable instructions comprise at least one algorithm for selecting the at least one corresponding proposal for a cooking recipe from the plurality of stored recipes on the basis of the selection by the user of at least one of the search criteria for a cooking recipe.

33. The non-transitory computer-readable medium according to claim 31, characterized in that
the computer-executable instructions comprise an algorithm for adapting at least one recipe parameter of at least one of the plurality stored cooking recipes to an operational feature of the cooking appliance.

34. The non-transitory computer-readable medium according to claim 33, characterized in that
the at least one recipe parameter is at least one of a recipe food ingredient amount, cooking or baking temperature, cooking or baking duration, and/or generic cooking mode and/or wherein the operational feature of the cooking appliance is a volume of an oven cavity of the cooking appliance, a calorific output of at least one heating element of the cooking appliance and/or a calorific output of a cooking mode of the cooking appliance such as a mode of the cooking appliance for radiation cooking, for forced convection cooking, for steam cooking, for microwave cooking or for induction cooking.

35. The non-transitory computer-readable medium according to claim 30, characterized in that
the computer-executable instructions comprise an algorithm for adapting at least one operational parameter of the cooking appliance according to at least one recipe parameter of a cooking recipe that has been selected by the user from a proposal by a recipe generator for a cooking recipe, wherein the at least one operational parameter of the cooking appliance is a cooking or baking temperature, a cooking or baking duration and/or a mode of the cooking appliance for radiation cooking, for forced convection cooking, for steam cooking, for microwave cooking or for induction cooking.

36. The non-transitory computer-readable medium according to claim 30, characterized in that
the computer-executable instructions provide a multi-timer function for two or more dishes and/or courses in or on the cooking appliance, wherein the dishes and/or courses can be treated together in the same oven cavity at the same temperature, but can require different cooking durations, and wherein elapsed and/or remaining cooking durations of individual dishes and/or courses are indicated by a display or the touch screen of the mobile computer device.

37. The non-transitory computer-readable medium according to claim 30, characterized in that
the computer-executable instructions provide a cooking time reduction function and/or a cooking temperature reduction function, wherein a user may reduce the cooking time and/or the cooking temperature of the cooking appliance by the mobile computer device via a wireless data bidirectional connection between the oven and the mobile computer device.

38. The method according to claim 1, wherein
the oven comprises a forced convection oven, a microwave oven or an induction oven.

39. An oven including a cooking oven with a cooking space including an oven cavity and/or a cooking hob, connected or connectable to a mobile computer device via a wireless data connection,
wherein the oven and the mobile computer device are interconnected or interconnectable via a wireless data connection that is adapted for transferring signals between the oven and the mobile computer device,
wherein the oven comprises a camera arranged at an upper side of the cooking space so as to generate a sequence of images as a video stream for obtaining a video which shows cooking process images of a food stuff in the cooking space in the oven, wherein the video stream is transmitted over the wireless data connection,
wherein:
in response to the oven receiving, from the mobile computer device, a wakeup signal for waking up the camera to transmit the cooking process images of the food stuff in the cooking space in the oven to the mobile computer device via the wireless data connection, the oven shifts the camera into an operating state, wherein:

the mobile computer device comprises a touch screen configured to display a plurality of areas at a same time, the plurality of areas including a first area for showing a recipe that a user selected and a second area for allowing the user to remotely control cooking parameters of the oven via the wireless data connection, wherein when a door closing signal indicating that an oven door is closed is received by the camera:

the camera is shifted into the operating state, and the oven turns on an inside light when the camera is activated to stream the cooking process images of the food stuff in the cooking space in the oven to the mobile computer device in response to the oven door closing signal being received, and the inside light is turned off.

40. The oven according to claim 39, wherein the oven comprises at least one camera arranged to detect visually and to provide a picture signal of a food stuff being treated by the cooking appliance in the oven cavity or on the cooking hob.

41. The oven according to claim 39, wherein in response to the user selecting one of a plurality of recipes displayed on the mobile computer device, the mobile computer device adjusts the cooking parameters of the oven according to the selected recipe via the wireless data connection.

42. The oven according to claim 39, wherein the mobile computer device is configured to, via the wireless data connection, reduce a cooking time and/or a cooking temperature, while being configured not to increase the cooking time the cooking temperature.

43. The oven according to claim 39, wherein the mobile computer device is configured to, via the wireless data connection, increase a cooking time and/or a cooking temperature by a slider on the touch screen that is activated only with two fingers at a same time.

44. The oven according to claim 39, wherein the oven comprises a forced convection oven, a microwave oven or an induction oven.

45. A mobile computer device connected or connectable to an oven with a cooking space via a wireless data connection, wherein the mobile computer device comprises at least one display and/or touchscreen, wherein the oven and the mobile computer device are interconnected or interconnectable via the wireless data connection that is adapted for transferring signals between the oven and the mobile computer device, wherein the oven comprises a camera arranged at an upper side of the cooking space so as to generate a sequence of images as a video stream for obtaining a video which shows cooking process images of a food stuff in the cooking space in the oven, wherein the video stream is transmitted over the wireless data connection, wherein:

in response to the oven receiving, from the mobile computer device, a wakeup signal for waking up the camera to transmit the cooking process images of the food stuff in the cooking space in the oven to the mobile computer device via the wireless data connection, the oven shifts the camera into an operating state, wherein:

the mobile computer device comprises a touch screen configured to display a plurality of areas at a same time, the plurality of areas including a first area for showing a recipe that a user selected and a second area for allowing the user to remotely control cooking parameters of the oven, wherein when a door closing signal indicating that a door of the oven is closed is received by the camera:

the camera is shifted into the operating state, and the oven turns on an inside light when the camera is activated to stream the cooking process images of the food stuff in the cooking space in the oven to the mobile computer device in response to an oven door closing signal being received, and the inside light is turned off.

46. A non-transitory computer-readable medium having stored thereon computer-executable instructions that, when executed, cause a mobile computer device to perform a method comprising, interconnecting an oven with a cooking space and the mobile computer device via a wireless data connection that is adapted for transferring signals between the oven and the mobile computer device, generating by a camera arranged at an upper side of the cooking space, a sequence of images as a video stream for obtaining a video which shows cooking process images of a food stuff in the cooking space in the oven, transmitting the video stream via the wireless data connection from the oven to the mobile computer device, wherein:

in response to the oven receiving, from the mobile computer device, a wakeup signal for waking up the camera to transmit the cooking process images of the food stuff in the cooking space in the oven to the mobile computer device via a wireless network, the oven shifts the camera into an operating state, and displaying a plurality of areas on a touch screen of the mobile computer device at a same time, the plurality of areas including a first area for showing a recipe that a user selected and a second area for allowing the user to remotely control cooking parameters of the oven via the wireless data connection, wherein when a door closing signal indicating that a door of the oven is closed is received by the camera:

the camera is shifted into the operating state, and the oven turns on an inside light when the camera is activated to stream the cooking process images of the food stuff in the cooking space in the oven to the mobile computer device in response to the oven door closing signal being received, and the inside light is turned off.

47. The non-transitory computer-readable medium according to claim 46, wherein the oven comprises a forced convection oven, a microwave oven or an induction oven.

* * * * *